US008837179B2

(12) United States Patent
Ishioka

(10) Patent No.: US 8,837,179 B2
(45) Date of Patent: Sep. 16, 2014

(54) ALTERNATING CURRENT POWER SUPPLY DEVICE AND METHOD OF CONTROLLING SAME

(75) Inventor: Atsushi Ishioka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 315 days.

(21) Appl. No.: 13/123,691
(22) PCT Filed: Jul. 30, 2009
(86) PCT No.: PCT/JP2009/063545
§ 371 (c)(1),
(2), (4) Date: Apr. 11, 2011
(87) PCT Pub. No.: WO2010/044303
PCT Pub. Date: Apr. 22, 2010

(65) Prior Publication Data
US 2011/0194319 A1    Aug. 11, 2011

(30) Foreign Application Priority Data
Oct. 17, 2008    (JP) ................. 2008-268059

(51) Int. Cl.
*H02M 7/48*        (2006.01)
*H02M 7/493*       (2007.01)
*H01M 8/12*        (2006.01)
*H02M 1/00*        (2006.01)
*H02J 1/00*        (2006.01)

(52) U.S. Cl.
CPC ...... *H02M 7/493* (2013.01); *H01M 2008/1293* (2013.01); *H01M 2250/10* (2013.01); *Y02E 60/525* (2013.01); *H02M 2001/0019* (2013.01); *Y02B 90/14* (2013.01); *H02J 2001/004* (2013.01)
USPC .............................................. 363/71; 363/65

(58) Field of Classification Search
USPC ................................................ 363/65, 71, 72
See application file for complete search history.

(56) References Cited

U.S. PATENT DOCUMENTS

| | | | |
|---|---|---|---|
| 6,252,785 B1 * | 6/2001 | Hagihara et al. | 363/71 |
| 2005/0141248 A1 * | 6/2005 | Mazumder et al. | 363/39 |
| 2008/0062729 A1 * | 3/2008 | Kanai et al. | 363/49 |
| 2009/0290393 A1 * | 11/2009 | Angerer et al. | 363/49 |
| 2010/0085784 A1 * | 4/2010 | Chou et al. | 363/45 |
| 2010/0109328 A1 * | 5/2010 | Li et al. | 290/44 |

FOREIGN PATENT DOCUMENTS

| | | | |
|---|---|---|---|
| JP | 61-135364 A | 6/1986 |
| JP | 61-135365 A | 6/1986 |
| JP | 61-135366 A | 6/1986 |
| JP | 61-273178 A | 12/1986 |

(Continued)

*Primary Examiner* — Nguyen Tran
(74) *Attorney, Agent, or Firm* — Rankin, Hill & Clark LLP

(57) ABSTRACT

An alternating current power supply device comprises a DC power supply for generating direct current power, a plurality of, e.g., three first DC/AC inverter to third DC/AC inverter which are arranged in parallel and electrically connected to the DC power supply, for converting the direct current power generated by the DC power supply into alternating current power and supplying the alternating current power to a load, and a control unit for controlling the driving of the first DC/AC inverter to the third DC/AC inverter. The capacitance A of the first DC/AC inverter is set to W/6, the capacitance A of the second DC/AC inverter is set to W/3, and the capacitance A of the third DC/AC inverter is set to W/2.

17 Claims, 12 Drawing Sheets

(56) References Cited

FOREIGN PATENT DOCUMENTS

| JP | 2002-369541 A | 12/2002 |
| JP | 2006-333625 A | 12/2006 |
| WO | WO 2008/036990 A1 | 4/2008 |

\* cited by examiner

FIG. 2

| COMBINATION No. | TOTAL CAPACITY | COMBINATION OF DC/AC INVERTERS | | |
|---|---|---|---|---|
| | | 16c (3w/6) | 16b (2w/6) | 16a (w/6) |
| 1 | 1W/6 | OFF | OFF | ON |
| 2 | 2W/6 | OFF | ON | OFF |
| 3 | 3W/6 | OFF | ON | ON |
| 4 | 3W/6 | ON | OFF | OFF |
| 5 | 4W/6 | ON | OFF | ON |
| 6 | 5W/6 | ON | ON | OFF |
| 7 | 6W/6 | ON | ON | ON |

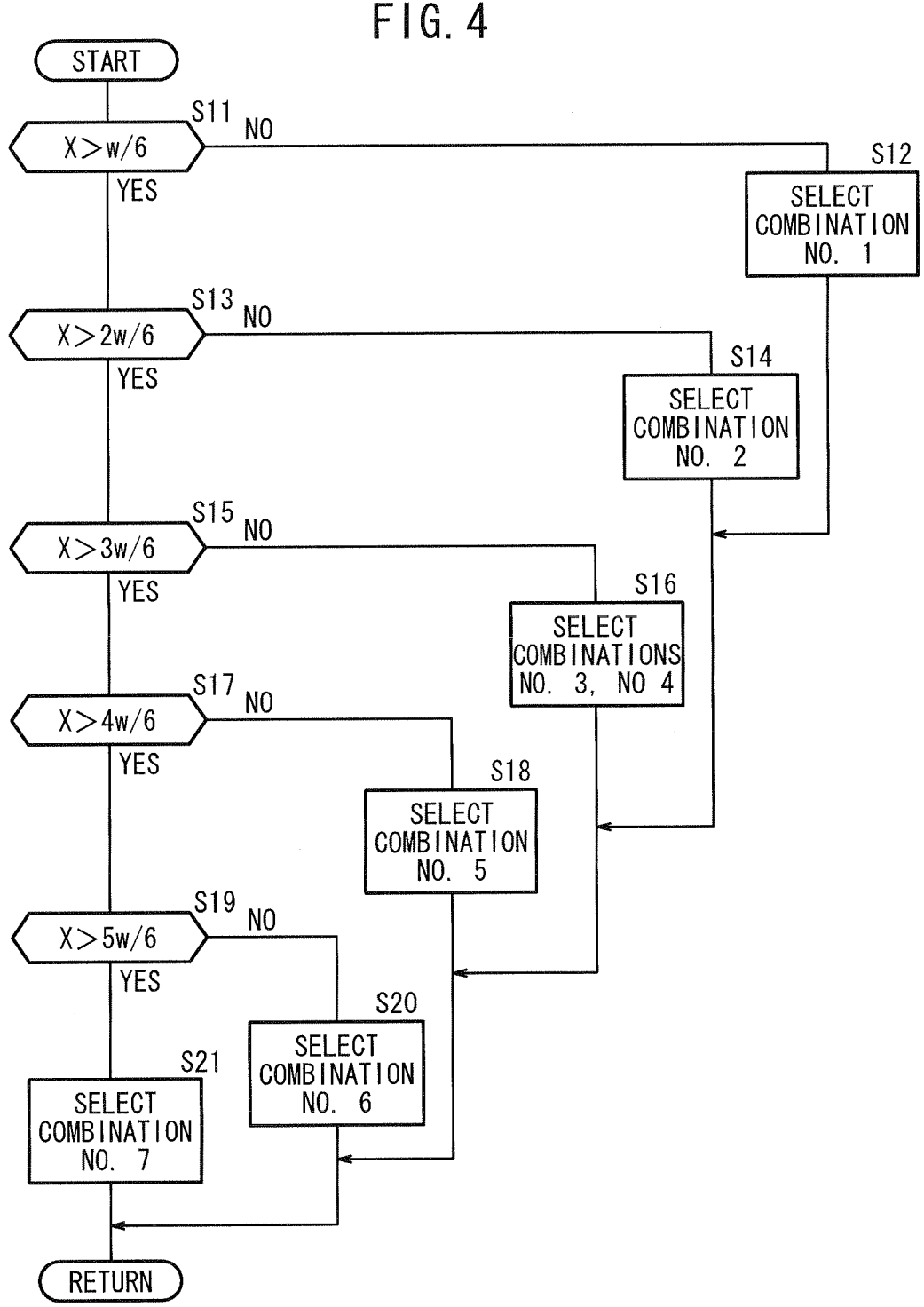

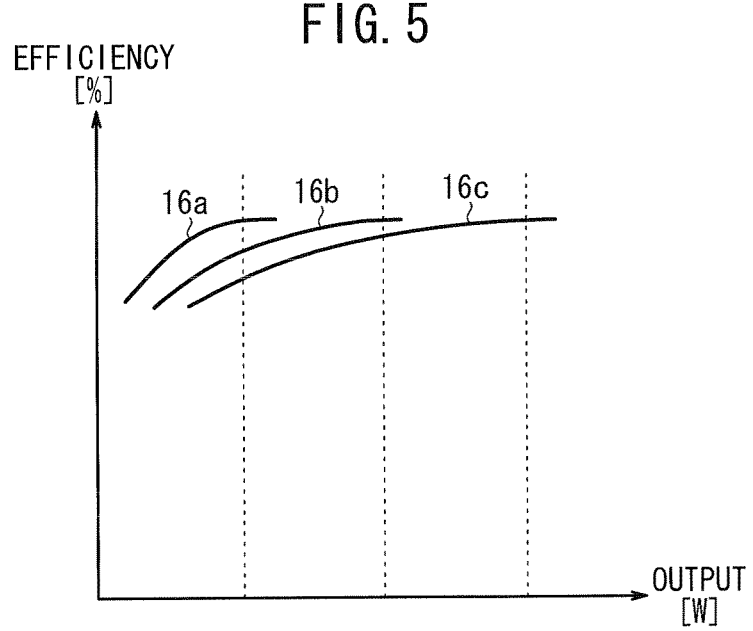

FIG. 6

| NUMBER OF INVERTERS | FIRST EMBODIMENT | | | CONVENTIONAL STRUCTURE | | |
|---|---|---|---|---|---|---|
| | CAPACITY (2mw/n(n+1)) | CAPACITY (ALL TYPES) | NUMBER OF STAGES OF GENERATED OUTPUT POWER | CAPACITY (GENERAL FORMULA) | CAPACITY (ALL TYPES) | NUMBER OF STAGES OF GENERATED OUTPUT POWER |
| 2 | mW/3 | W/3, 2W/3 | 3 | W/2 | W/2, W/2 | 2 |
| 3 | mW/6 | W/6, W/3, W/3, | 6 | W/3 | W/3, W/3, W/3 | 3 |
| 4 | mW/10 | W/10, W/5, 3W/10, 2W/5 | 10 | W/4 | W/4, W/4, W/4, W/4 | 4 |
| 5 | mW/15 | W/15, 2W/15, W/5, 4W/15, W/3 | 15 | W/5 | W/5, W/5, W/5, W/5, W/5 | 5 |
| 6 | mW/21 | W/21, 2W/21, W/7, 4W/21, 5W/21, 2W/7 | 21 | W/6 | W/6, W/6, W/6, W/6, W/6, W/6 | 6 |
| ⋯ | ⋯ | ⋯ | ⋯ | ⋯ | ⋯ | ⋯ |

ALTERNATING CURRENT POWER SUPPLY DEVICE AND METHOD OF CONTROLLING SAME

CROSS-REFERENCE TO RELATED APPLICATION

This application is a National Stage entry of International Application No. PCT/JP2009/063545, filed Jul. 30, 2009, which claims priority to Japanese Patent Application No. 2008-268059 filed Oct. 17, 2008, the disclosure of the prior applications are incorporated in its entirety by reference.

TECHNICAL FIELD

The present invention relates to an alternating current power supply device including a direct current power supply for generating direct current power, a plurality of parallel direct current to alternating current converters electrically connected to the direct current power supply, for converting the direct current power generated by the direct current power supply into alternating current power and supplying the alternating current power to a load, and a controller for controlling operation of the direct current to alternating current converters, and a method of controlling such an alternating current power supply device.

BACKGROUND ART

Usually, solid oxide fuel cells (SOFCs) employ an electrolyte of ion conductive solid oxide, e.g., stabilized zirconia. The electrolyte is interposed between an anode and a cathode to form an electrolyte electrode assembly (MEA). The electrolyte electrode assembly is interposed between separators (bipolar plates). In use, generally, predetermined numbers of the electrolyte electrode assemblies and the separators are stacked together to form a fuel cell stack.

Fuel cells of the type described above, solar cells, or the like are used as a direct current power supply for generating direct current power, in an alternating current power supply device for supplying alternating current power to a load, for example. The direct current power generated by the direct current power supply is converted into alternating current power by a converter (direct current to alternating current converter) such as a DC/AC inverter or the like.

Generally, the power conversion efficiency of a DC/AC inverter is maximized when it operates under a nominal load. When the DC/AC inverter operates under a partial load, the power conversion efficiency thereof drops. The drop in the power conversion efficiency tends to adversely affect the efficiency of the overall alternating current power supply device. Structures incorporating a plurality of DC/AC inverters have been adopted in order to improve the adversely affected efficiency.

For example, Japanese Laid-Open Patent Publication No. 61-135364 discloses a low-loss power supply device including, as shown in FIG. 10 of the accompanying drawings, two parallel inverters 3*a*-1, 3*a*-2 connected between a direct current power supply 1*a* and a filter 2*a*. The inverter 3*a*-1 has a capacity corresponding to the added capacities of loads such as refrigerators or the like which are operating at all times, and operates at all times. On the other hand, the inverter 3*a*-2 is controlled by a controller 4*a* to be operated or shut down depending on the load state.

Japanese Laid-Open Patent Publication No. 61-135365 discloses a low-loss power converting device including, as shown in FIG. 11 of the accompanying drawings, a direct current power supply 1*b* which supplies a direct current via switches 2*b*-1, 2*b*-2, 2*b*-3 to inverters 3*b*-1, 3*b*-2, 3*b*-3. The inverters 3*b*-1, 3*b*-2, 3*b*-3 convert the supplied direct current into an alternating current, which is supplied to loads 4*b*-1, 4*b*-2, ... 4*b*-*n*.

A load detecting circuit 5*b* detects the magnitudes of loads based on a load current from a current transformer 6*b*, and supplies the detected magnitudes of loads to a control circuit 7*b*. The control circuit 7*b* determines one of the inverters to be operated based on the magnitudes of loads.

Japanese Laid-Open Patent Publication No. 61-135366 discloses a method of controlling a power converting device. According to the disclosed method, as shown in FIG. 12 of the accompanying drawings, a direct current from a direct current power supply 1*c* is supplies via switches 2*c*-1 through 2*c*-3 to inverters 3*c*-1 through 3*c*-3, which convert the supplied direct current into an alternating current to be supplied to loads 4*c*-1 through 4*c*-*n*. A load current detector 5*c* detects a load current supplied to the loads 4*c*-1 through 4*c*-*n*, and inputs the detected load current to a control circuit 6*c*.

The control circuit 6*c* determines the number of inverters to be operated based on the detected load current. The control circuit 6*c* also refers to operating states of the inverters 3*c*-1 through 3*c*-3 which are stored in a storage device 7*c*, and determines one of the inverters to be operated or shut down next.

Japanese Laid-Open Patent Publication No. 61-273178 discloses a low-loss power converting device including a plurality of parallel inverters, a load detecting means, for detecting whether the load has been activated or not, a load capacity input means, associated with each load, for inputting the capacity of the load each time the load detecting means detects the activation of the load, an adding means for adding output signals from the load capacity input means, and an inverter activating means for determining one of the inverters to be operated based on an output signal from the adding means and activating the inverter.

SUMMARY OF INVENTION

According to Japanese Laid-Open Patent Publication No. 61-135364, the capacities of the inverters 3*a*-1, 3*a*-2 have already been determined depending on the capacities of the loads. Specifically, the inverters 3*a*-1, 3*a*-2 are capable of handling certain loads only and hence can be used in a limited range of applications. Consequently, the power conversion efficiency cannot be increased in a wide range of operations from the nominal load to partial load for the direct current power supply 1*a*.

In addition, handling various different loads needs to provide as many inverters as required by the capacities of the loads. Therefore, the number of inverters needed grows considerably, making the system uneconomical.

According to Japanese Laid-Open Patent Publication No. 61-135365, as the number of loads 4*b*-1 through 4*b*-*n* increases, the number of inverters 3*b*-1 through 3*b*-3 also needs to increase. Consequently, the system becomes complex, is highly costly, and hence is not economical.

According to Japanese Laid-Open Patent Publication No. 61-135366, as with Japanese Laid-Open Patent Publication No. 61-135365, it is necessary to depend on the number of inverters 3*b*-1 through 3*b*-3 to handle a wide range of operations involving the loads 4*c*-1 through 4*c*-*n*. Consequently, the system becomes complex, is highly costly, and hence is not economical. Furthermore, as the number of loads 4*c*-1 through 4*c*-*n* grows, the number of inverters used needs to grow, so that the cost of the system cannot be reduced.

According to Japanese Laid-Open Patent Publication No. 61-273178, the parallel inverters alone fail to increase the power conversion efficiency in a wide range of operations from the nominal load to partial load for the direct current power supply. In addition, as the number of loads grows, the number of inverters used needs to grow, so that the cost of the system cannot be reduced.

The present invention has been made in order to solve the above problems. It is an object of the present invention to provide an alternating current power supply device which includes as few direct current to alternating current converters as possible, is simple in construction and low in cost, and is capable of increasing power conversion efficiency thereof in a wide range of operations, and a method of controlling such an alternating current power supply device.

According to the present invention, there is provided an alternating current power supply device comprising a direct current power supply for generating direct current power, a plurality of parallel direct current to alternating current converters electrically connected to the direct current power supply, for converting the direct current power generated by the direct current power supply into alternating current power and supplying the alternating current power to a load, and a controller for controlling operation of the direct current to alternating current converters.

Of n (n: a natural number of 2 or greater) direct current to alternating current converters, capacity A(m) of the mth (m: a natural number, $1 \leq m \leq n$) direct current to alternating current converter is related to rated output W of the direct current power supply by $A(m)=2mW/(n(n+1))$.

According to the present invention, there is also provided a method of controlling an alternating current power supply device including a direct current power supply for generating direct current power, a plurality of parallel direct current to alternating current converters electrically connected to the direct current power supply, for converting the direct current power generated by the direct current power supply into alternating current power and supplying the alternating current power to a load, and a controller for controlling operation of the direct current to alternating current converters. Of n (n: a natural number of 2 or greater) direct current to alternating current converters, capacity A(m) of the mth (m: a natural number, $1 \leq m \leq n$) direct current to alternating current converter is related to rated output W of the direct current power supply by $A(m)=2mW/(n(n+1))$.

The above method comprises a first step of detecting a demanded load power which is a demanded power required by the load, a second step of setting a combination of the direct current to alternating current converters for operation depending on the detected demanded load power, a third step of determining whether there are a plurality of combinations or not, and a fourth step of, if it is judged that there are a plurality of combinations, selecting one of the combinations.

According to the present invention, the direct current to alternating current converters can be operated parallel to each other for thereby increasing the power conversion efficiency in a wide range of operations from operations from the nominal load to partial load for the direct current power supply. Therefore, the power generating efficiency of the overall alternating current power supply device is greatly increased. In addition, any of direct current to alternating current converters which do not need to be operated may be shut down. Therefore, the direct current to alternating current converters can easily be improved in durability and service life.

Furthermore, the direct current to alternating current converters have different capacities, respectively. Thus, any increase in the number of direct current to alternating current converters used is held to a minimum for handling a wide range of operations, and the alternating current power supply device is simplified in construction and reduced in cost.

For the rated output W of the direct current power supply, the direct current to alternating current converters which have different capacities can be combined in operation to provide multiple stages of generated output power (in a wide range of operations). The power conversion efficiency is thus increased, and the power generating efficiency of the overall alternating current power supply device is increased.

According to the present invention, furthermore, a combination of the direct current to alternating current converters is set for operation depending on the detected demanded load power. The power conversion efficiency is thus increased, and the power generating efficiency of the overall alternating current power supply device is increased.

If there are a plurality of combinations of the direct current to alternating current converters for operation, then an optimum one of the combinations can be selected. Consequently, the direct current to alternating current converters can be controlled finely in operation. In addition, any of the direct current to alternating current converters which do not need to be operated may be shut down. Therefore, the direct current to alternating current converters can easily be improved in durability and service life.

BRIEF DESCRIPTION OF DRAWINGS

FIG. 2 is a diagram showing combinations of inverters;

FIG. 4 is a flowchart of a process of searching for an inverter combination;

FIG. 5 is a diagram showing the relationship between the output powers of inverters having different capacities and the efficiencies thereof;

FIG. 6 is a diagram showing the numbers of inverters and the numbers of generated output power stages (the numbers of points where power conversion efficiency is particularly good) of the first embodiment and a conventional structure;

DESCRIPTION OF EMBODIMENTS

Figure 1:
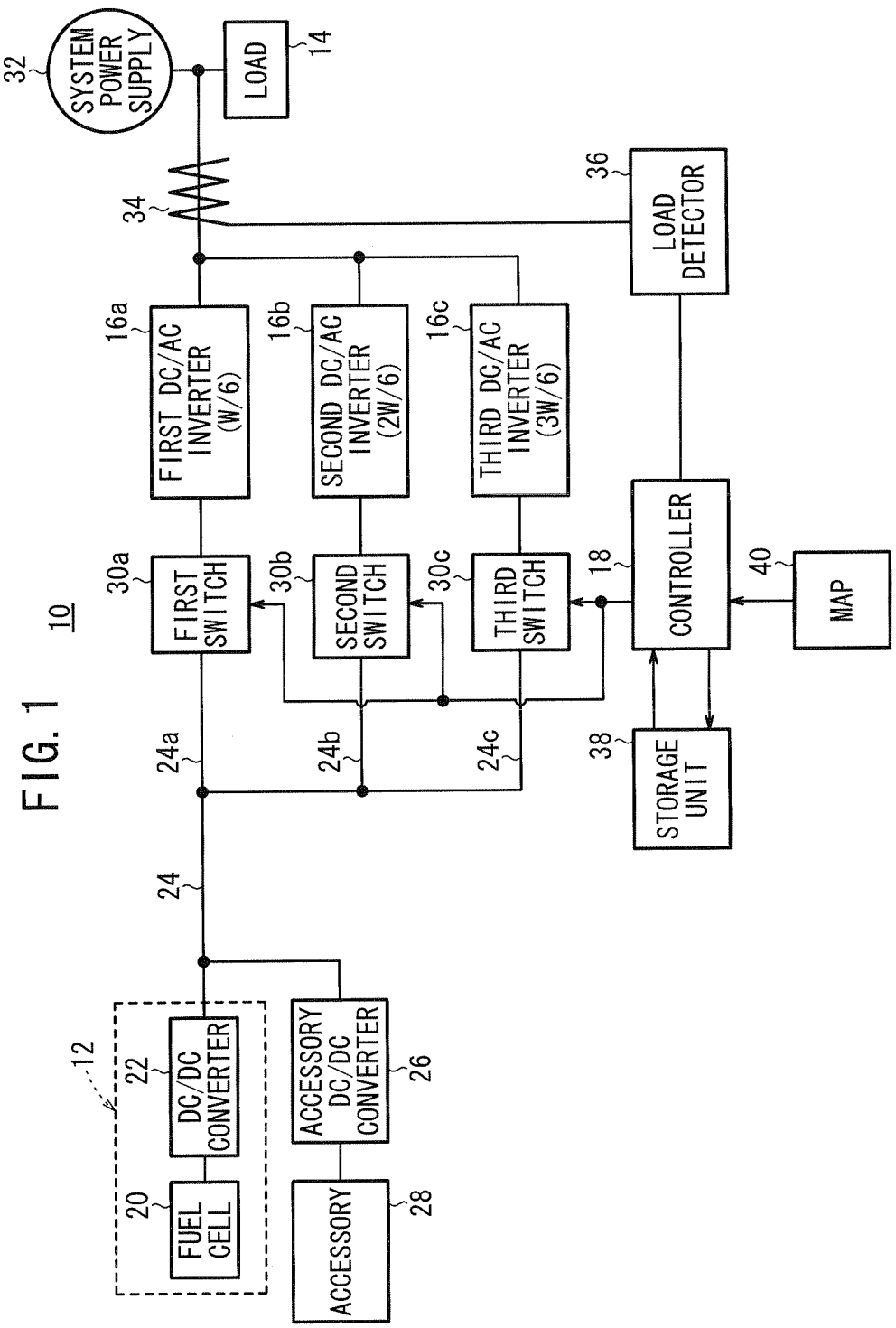
FIG. 1 is a block diagram of an alternating current power supply device according to a first embodiment of the present invention.

As shown in FIG. 1, an alternating current power supply device 10 according to a first embodiment of the present invention includes a direct current power supply 12 for generating direct current power, a plurality of, e.g., three, parallel DC/AC inverters, including a first DC/AC inverter (direct current to alternating current converter) 16a, a second DC/AC inverter 16b, and a third DC/AC inverter 16c, electrically connected to the direct current power supply 12, for converting the direct current power generated by the direct current power supply 12 into alternating current power and supplying the alternating current power to a load 14, and a controller 18 for controlling operation of the first DC/AC inverter 16a, the second DC/AC inverter 16b, and the third DC/AC inverter 16c. If the alternating current power supply device 10 is used as a home fuel cell system, then the load 14 may be any of various home electric appliances.

The direct current power supply 12 includes a fuel cell 20 and a DC/DC converter 22 for converting direct current power generated by the fuel cell 20 into desired direct current power. The fuel cell 20 preferably comprises a solid oxide fuel cell (SOFC). The solid oxide fuel cell employs an electrolyte made of an ion conductive solid oxide such as stabilized zirconia. The electrolyte is interposed between an anode and a cathode to form an electrolyte electrode assembly (MEA). The electrolyte electrode assembly is interposed between separators (bipolar plates).

Usually, the solid oxide fuel cell is used as a fuel cell stack wherein a certain number of MEAs and separators are stacked, and is combined with a desulfurizer, a reformer, a heat exchanger, or the like.

The direct current power supply 12 has an output terminal connected to a power supply line 24 that is connected to an accessory 28 through an accessory DC/DC converter 26. The accessory 28 is a device for operating the fuel cell 20, and includes a pump for supplying a fuel gas to the fuel cell 20, a blower for supplying an oxygen-containing gas (air) to the fuel cell 20, etc.

The power supply line 24 is branched into a first power supply line 24a, a second power supply line 24b, and a third power supply line 24c. A first switch 30a such as an electromagnetic contactor and a first DC/AC inverter 16a are connected in series to the first power supply line 24a. A second switch 30b and a second DC/AC inverter 16b are connected in series to the second power supply line 24b. A third switch 30c and a third DC/AC inverter 16c are connected in series to the third power supply line 24c.

The first power supply line 24a, the second power supply line 24b, and the third power supply line 24c have respective downstream ends joined into the power supply line 24 connected to the load 14. The load 14 is connected to a system power supply 32.

The power supply line 24 is combined with a load current detector 34, which supplies a detected load current to a load detector 36. The load detector 36 is connected to the controller 18. The controller 18 is associated with a storage unit 38 and a map 40, if necessary. The storage unit 38 stores performance information and operation histories of the first DC/AC inverter 16a, the second DC/AC inverter 16b, and the third DC/AC inverter 16c.

With respect to a rated output W of the direct current power supply 12, the first DC/AC inverter 16a has a capacity A(1) set to W/6, the second DC/AC inverter 16b has a capacity A(2) set to W/3, and the third DC/AC inverter 16c has a capacity A(3) set to W/2. In other words, the capacities of the first DC/AC inverter 16a, the second DC/AC inverter 16b, and the third DC/AC inverter 16c have the relationship: the capacity A(1) <the capacity A(2)<the capacity A(3).

According to the present invention, if the alternating current power supply device 10 has n (n: a natural number of 2 or greater) DC/AC inverters 16a through 16n, then the capacity A(m) of the mth (m: a natural number, $1 \leq m \leq n$) DC/AC inverter 16m is related to the rated output W of the direct current power supply 12 by $A(m)=2mW/(n(n+1))$.

FIG. 2 shows combinations of the first DC/AC inverter 16a, the second DC/AC inverter 16b, and the third DC/AC inverter 16c. Total capacities W/6 through W are available in combinations No. 1 through No. 7. These combinations are stored beforehand in the map 40 or calculated according to a calculation formula.

Figure 3:
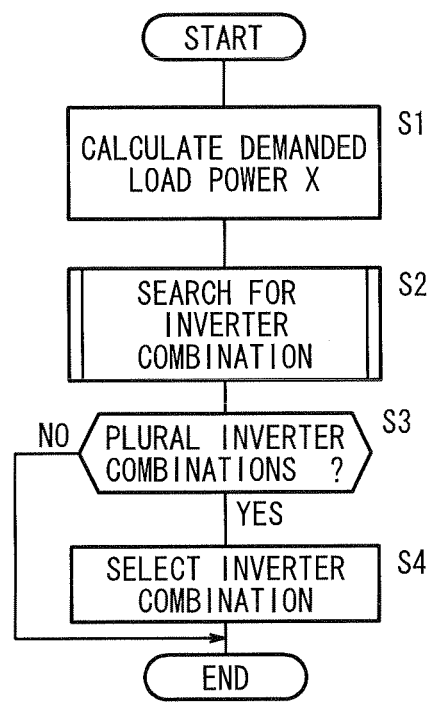
FIG. 3 is a flowchart of a method of controlling the alternating current power supply device.

Operation of the alternating current power supply device 10 will be described below with reference to a flowchart shown in FIG. 3.

The alternating current power supply device 10 includes the fuel cell 20 as the direct current power supply 12. When the fuel cell 20 is operated, the direct current power supply 12 generates direct current power. The generated direct current power is adjusted to a prescribed voltage (rated output W) by the DC/DC converter 22, and then output to the power supply line 24. The output direct current power is partly supplied through the accessory DC/DC converter 26 to the accessory 28 for operating the fuel cell 20.

The power supply line 24 is branched into the first power supply line 24a, the second power supply line 24b, and the third power supply line 24c, as described above. When the first switch 30a, the second switch 30b, and the third switch 30c are turned on (connected), the direct current power from the direct current power supply 12 is converted into alternating current power by first DC/AC inverter 16a, the second DC/AC inverter 16b, and the third DC/AC inverter 16c depending on desired capacities, and the alternating current power is supplied to the load 14.

The load detector 36 detects a load current supplied to the load 14 through the load current detector 34, and sends a signal indicative of the detected load current to the controller 18. The controller 18 calculates a demanded load power X which is a demanded power required by the load 14 based on the detected load current (step S1).

Then, control goes to step S2 in which the controller 18 searches for an inverter combination matching the calculated demanded load power X. Specifically, as shown in FIG. 4, the controller 18 determines whether the demanded load power X is in excess of W/6 or not (step S11). If the controller 18 judges that the demanded load power X is equal to or smaller than W/6 (NO in step S11), then control goes to step S12 in which the controller 18 selects the combination No. 1 (see FIG. 2). The combination No. 1 is a combination wherein only the first DC/AC inverter 16a is operated and the second DC/AC inverter 16b and the third DC/AC inverter 16c are shut down.

Therefore, in FIG. 1, the first switch 30a is turned on, and the second switch 30b and the third switch 30c are turned off. The direct current power output from the direct current power supply 12 is converted by the first DC/AC inverter 16a into alternating current power, which is supplied to the load 14.

If the controller 18 judges that the demanded load power X is in excess of W/6 (YES in step S11), then control goes to step S13. If the controller 18 judges that the demanded load power X is equal to or smaller than 2 W/6 (NO in step S13), then control goes to step S14 in which the controller 18 selects the combination No. 2. The combination No. 2 is a combination wherein only the second DC/AC inverter 16b is operated and the first DC/AC inverter 16a and the third DC/AC inverter 16c are shut down.

If the controller 18 judges that the demanded load power X is in excess of 2 W/6 (YES in step S13), then control goes to step S15 in which the controller 18 determines whether the demanded load power X is in excess of 3 W/6 or not.

If the controller 18 judges that the demanded load power X is equal to or smaller than 3 W/6 (NO in step S15), then control goes to step S16 in which the controller 18 searches for the combination No. 3 and the combination No. 4. In the combination No. 3, the first DC/AC inverter 16a and the second DC/AC inverter 16b are operated, and the third DC/AC inverter 16c is shut down. In the combination No. 4, the third DC/AC inverter 16c is operated, and the first DC/AC inverter 16a and the second DC/AC inverter 16b are shut down.

In step S3, the controller 18 judges that there are a plurality of combinations (YES in step S3). Then, control goes to step S4 in which the controller 18 selects either one of the combinations. Specifically, the controller 18 selects one of the combination No. 3 and the combination No. 4 which has a smaller accumulated time (history of usage), or selects one of the combination No. 3 and the combination No. 4 which has a better efficiency with respect to requested power.

Specifically, as shown in FIG. 5, the first DC/AC inverter 16a which has a smaller capacity has a higher efficiency in a low output range than the second DC/AC inverter 16b and the third DC/AC inverter 16c which have a greater capacity than the first DC/AC inverter 16a. The controller 18 compares the efficiencies of the combination No. 3 and the combination No. 4 based on FIG. 5, and selects one of them which has a better efficiency. The relationship between the output powers and the efficiencies of the first DC/AC inverter 16a, the second DC/AC inverter 16b, and the third DC/AC inverter 16c shown in FIG. 5 is read as the map 40 into the controller 18, for example.

In FIG. 4, if the controller 18 judges that the demanded load power X is in excess of 3 W/6 (YES in step S15), then control goes to step S17. If the controller 18 judges that the demanded load power X is equal to or smaller than 4 W/6 (NO in step S17), then control goes to step S18 in which the controller 18 selects the combination No. 5. In the combination No. 5, the first DC/AC inverter 16a and the third DC/AC inverter 16c are operated, and the second DC/AC inverter 16b is shut down.

If the controller 18 judges that the demanded load power X is in excess of 4 W/6 (YES in step S17), then control goes to step S19. If the controller 18 judges that the demanded load power X is equal to or smaller than 5 W/6 (NO in step S19), then control goes to step S20 in which the controller 18 selects the combination No. 6. In the combination No. 6, the second DC/AC inverter 16b and the third DC/AC inverter 16c are operated, and the first DC/AC inverter 16a is shut down.

If the controller 18 judges that the demanded load power X is in excess of 5 W/6 (YES in step S19), then control goes to step S21. In step S21, the controller 18 selects the combination No. 7. In the combination No. 7, the first DC/AC inverter 16a, the second DC/AC inverter 16b, and the third DC/AC inverter 16c are operated.

According to the first embodiment, the first DC/AC inverter 16a, the second DC/AC inverter 16b, and the third DC/AC inverter 16c can be operated parallel to each other for thereby increasing the power conversion efficiency in a wide range of operations from operations from the nominal load to partial load for the direct current power supply 12. Therefore, the power generating efficiency of the overall alternating current power supply device 10 is greatly increased.

In addition, any of the first DC/AC inverter 16a, the second DC/AC inverter 16b, and the third DC/AC inverter 16c which do not need to be operated may be shut down. Therefore, the first DC/AC inverter 16a, the second DC/AC inverter 16b, and the third DC/AC inverter 16c can easily be improved in durability and service life.

Furthermore, the capacity A(1) of the first DC/AC inverter 16a is set to W/6, the capacity A(2) of the second DC/AC inverter 16b to W/3, and the capacity A(3) of the third DC/AC inverter 16c to W/2. Therefore, any increase in the number of inverters used is held to a minimum for handling a wide range of operations, and the alternating current power supply device 10 is simplified in construction and reduced in cost.

For the rated output W of the direct current power supply 12, the first DC/AC inverter 16a, the second DC/AC inverter 16b, and the third DC/AC inverter 16c which have different capacities can be combined in operation to provide multiple stages of generated output power (in a wide range of operations). The power conversion efficiency is thus increased, and the power generating efficiency of the overall alternating current power supply device 10 is increased.

FIG. 6 shows the relationship between the numbers of inverters and the numbers of stages of generated output power of the first embodiment and a conventional structure.

With the conventional structure, since a plurality of inverters have the same capacity, the number of stages of generated output power (the number of points where power conversion efficiency is particularly good) is the same as the number of inverters used. According to the first embodiment, however, since a plurality of inverters have different capacities, the number of stages of generated output power (the number of points where power conversion efficiency is particularly good) is much greater than the number of inverters used.

Consequently, any increase in the number of inverters used is held to a minimum for handling a wide range of operations (multiple stages of generated output power). In the first embodiment, the number of inverters used is set to 3. However, the number of inverters used may be set to 2 or greater.

As shown in FIG. 2, if there are a plurality of combinations for the same demanded load power X, or if the combination No. 3 and the combination No. 4 exist, then one of the combinations with a smaller accumulated time (history of usage) or with a better efficiency is selected.

Accordingly, an optimum combination can be selected, and the first DC/AC inverter 16a, the second DC/AC inverter 16b, and the third DC/AC inverter 16c can be controlled finely in operation. In addition, any of the first DC/AC inverter 16a, the second DC/AC inverter 16b, and the third DC/AC inverter 16c which do not need to be operated may be shut down. Therefore, the first DC/AC inverter 16a, the second DC/AC inverter 16b, and the third DC/AC inverter 16c can easily be improved in durability and service life.

The alternating current power supply device 10 includes the load detector 36 which detects the demanded load power required by the load 14. The controller 18 controls operation of each of the first DC/AC inverter 16a, the second DC/AC inverter 16b, and the third DC/AC inverter 16c depending on the detected demanded load power.

Therefore, depending on the detected demanded load power, the power conversion efficiency can be increased in a wide range of operations from the nominal load to partial load for the direct current power supply 12, for thereby increasing the efficiency of the overall alternating current power supply device 10. As an inverter or inverters which do not need to be operated can be shut down, the first DC/AC inverter 16a, the second DC/AC inverter 16b, and the third DC/AC inverter 16c can easily be improved in durability and service life.

Furthermore, the alternating current power supply device 10 also has the storage unit 38 which stores performance information and operation histories of the first DC/AC inverter 16a, the second DC/AC inverter 16b, and the third DC/AC inverter 16c. As the performance information and operation histories of the first DC/AC inverter 16a, the second DC/AC inverter 16b, and the third DC/AC inverter 16c are stored in advance, the first DC/AC inverter 16a, the second DC/AC inverter 16b, and the third DC/AC inverter 16c can be controlled finely in operation, and the first DC/AC inverter 16a, the second DC/AC inverter 16b, and the third DC/AC inverter 16c can be improved in durability and service life, making the alternating current power supply device 10 economical.

The controller 18 preferentially operates one or more of the first DC/AC inverter 16a, the second DC/AC inverter 16b, and the third DC/AC inverter 16c which can handle the demanded load power and which have a smaller capacity (see FIG. 2). Thus, an inverter or inverters matching the demanded load power can be operated, so that the power conversion efficiency is increased, and the power generating efficiency of the overall alternating current power supply device 10 is increased. In addition, any of the first DC/AC inverter 16a, the second DC/AC inverter 16b, and the third DC/AC inverter 16c which do not need to be operated may be shut down. Therefore, the first DC/AC inverter 16a, the second DC/AC inverter 16b, and the third DC/AC inverter 16c can easily be improved in durability and service life.

Moreover, controller 18 preferentially operates one or more of the first DC/AC inverter 16a, the second DC/AC inverter 16b, and the third DC/AC inverter 16c which have a higher conversion efficiency with respect to the demanded load power. The inverters have different relationships between their output powers and efficiencies depending on the different capacities. Specifically, if the combinations which meet the demanded load power X are the combination No. 3 and the combination No. 4 in FIG. 2, then the controller 18 compares the efficiency of the combination No. 3 which includes the first DC/AC inverter 16a and the second DC/AC inverter 16b and the efficiency of the combination No. 4 which includes the third DC/AC inverter 16c only with each other (see FIG. 5), and selects one of the combinations with the higher efficiency.

Therefore, an inverter or inverters matching the demanded load power can be operated, so that the power conversion efficiency is increased, and the power generating efficiency of the overall alternating current power supply device 10 is increased. In addition, any inverter or inverters which do not need to be operated may be shut down. Therefore, the first DC/AC inverter 16a, the second DC/AC inverter 16b, and the third DC/AC inverter 16c can easily be improved in durability and service life.

Furthermore, the controller 18 preferentially operates one or more of the first DC/AC inverter 16a, the second DC/AC inverter 16b, and the third DC/AC inverter 16c which have a shorter accumulated operating time. Therefore, the first DC/AC inverter 16a, the second DC/AC inverter 16b, and the third DC/AC inverter 16c can be operated in a uniform accumulated operating time, and any inverter or inverters which do not need to be operated can be shut down. Thus, the first DC/AC inverter 16a, the second DC/AC inverter 16b, and the third DC/AC inverter 16c can effectively be improved in durability and service life.

The direct current power supply 12 includes the fuel cell 20 which generates electric power based on an electrochemical reaction between a fuel gas and an oxygen-containing gas. Consequently, it is possible to convert direct current power into alternating current power efficiently in a wide range of operations from the nominal load to partial load for the fuel cell 20.

The fuel cell 20 comprises a solid oxide fuel cell. Since the fuel cell 20 comprises a solid oxide fuel cell among various other fuel cells, it can optimally maintain a high power generation efficiency.

Figure 7:
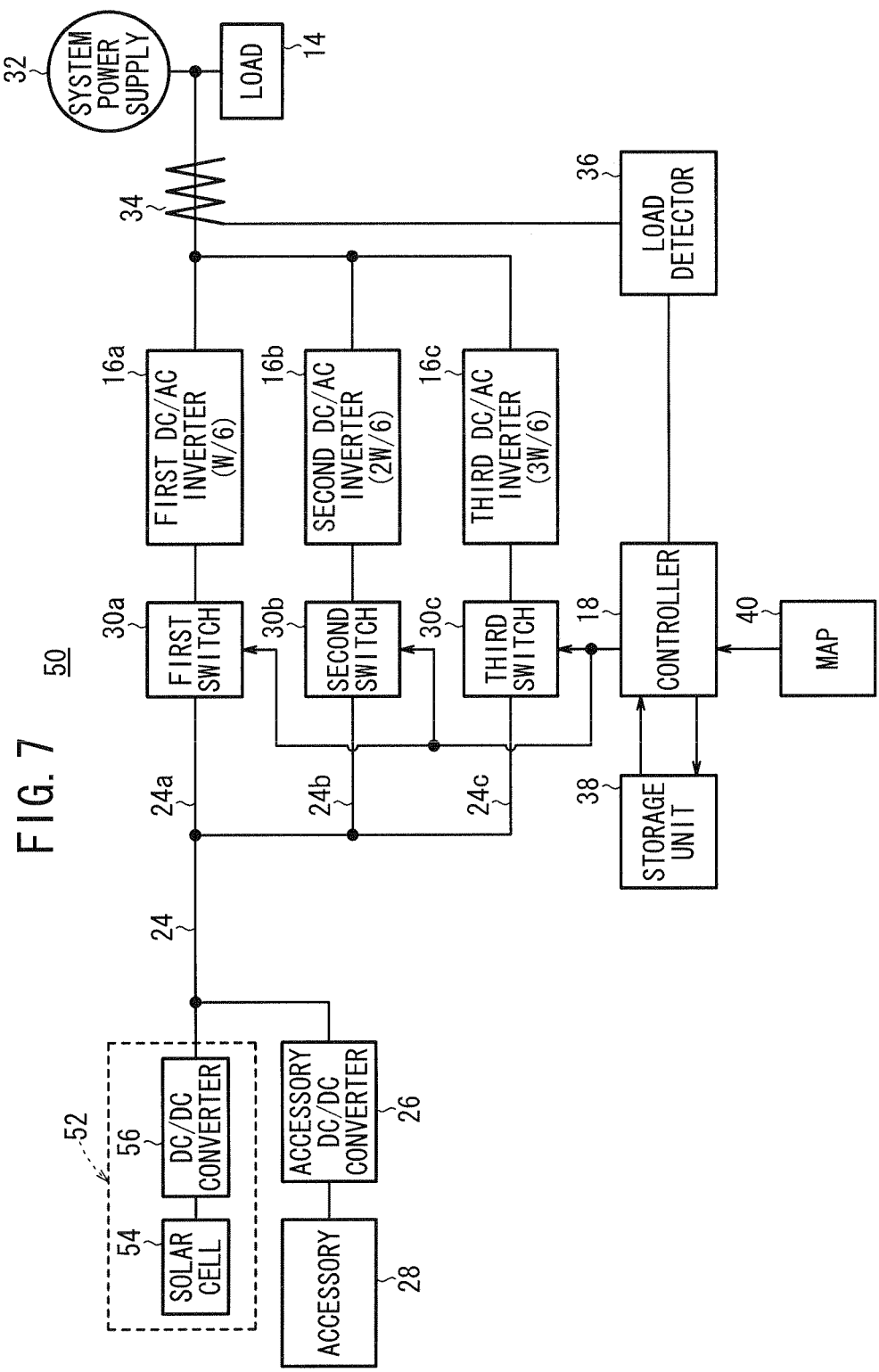
FIG. 7 is a block diagram of an alternating current power supply device according to a second embodiment of the present invention.

FIG. 7 is a block diagram of an alternating current power supply device 50 according to a second embodiment of the present invention. Those components of the alternating current power supply device 50 which are identical to those of the alternating current power supply device 10 according to the first embodiment are denoted by identical reference characters, and will not be described in detail below. Similarly, those components of alternating current power supply devices according to third and fourth embodiments to be described below which are identical to those of the alternating current power supply device 10 according to the first embodiment are also denoted by identical reference characters, and will not be described in detail below.

The alternating current power supply device 50 includes a direct current power supply 52 which comprises a solar cell 54 and a DC/DC converter 56 for converting a direct current voltage output from the solar cell 54 into a given direct current voltage. According to the second embodiment, since the direct current power supply 52 includes the solar cell 54, it is of increased versatility.

Figure 8:
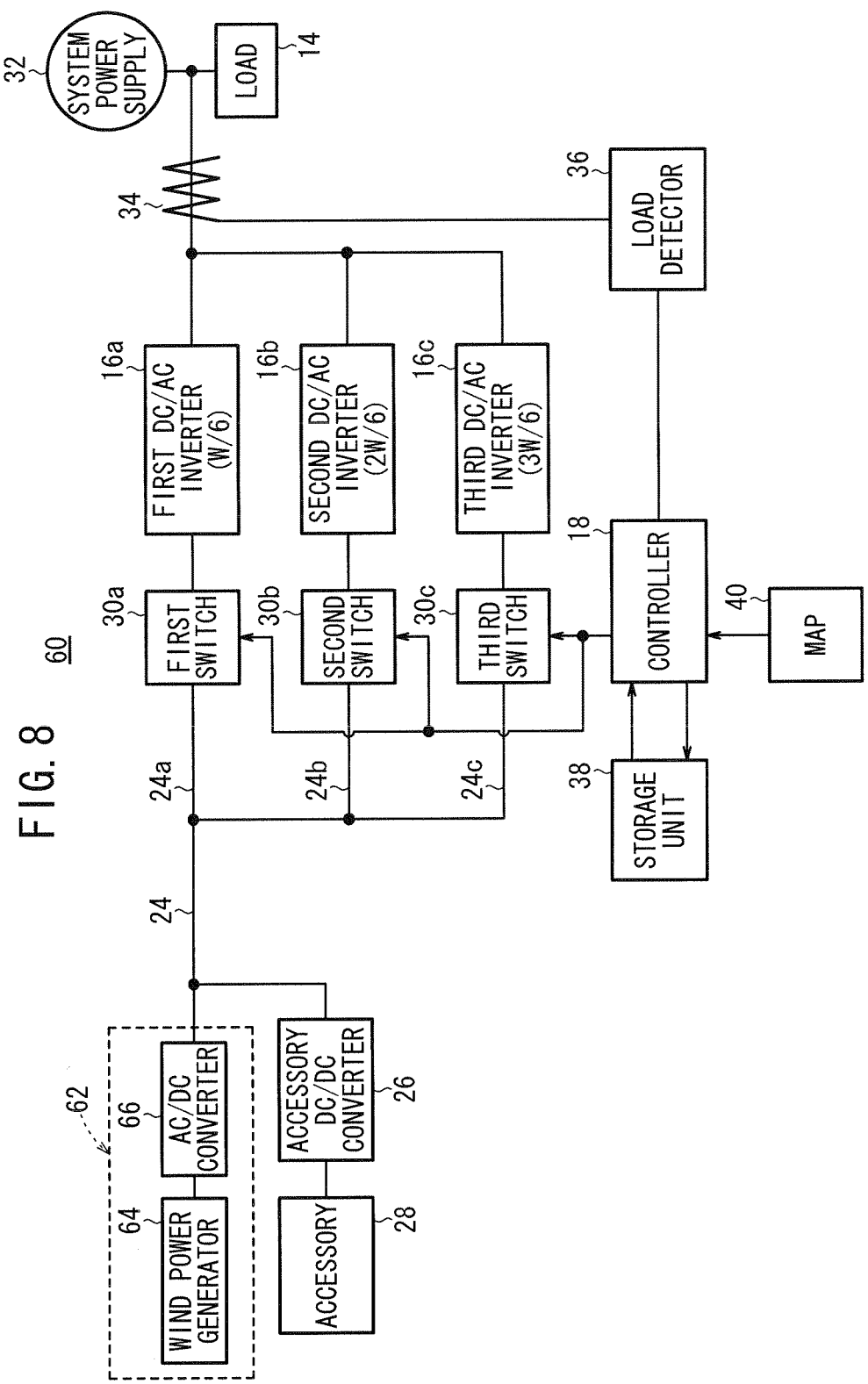
FIG. 8 is a block diagram of an alternating current power supply device according to a third embodiment of the present invention.

FIG. 8 is a block diagram of an alternating current power supply device 60 according to a third embodiment of the present invention.

The alternating current power supply device 60 includes a direct current power supply 62 which comprises a wind power generator 64 as an alternating current power generator and an AC/DC converter 66 for converting an alternating current voltage output from the wind power generator 64 into a given direct current voltage.

Figure 9:
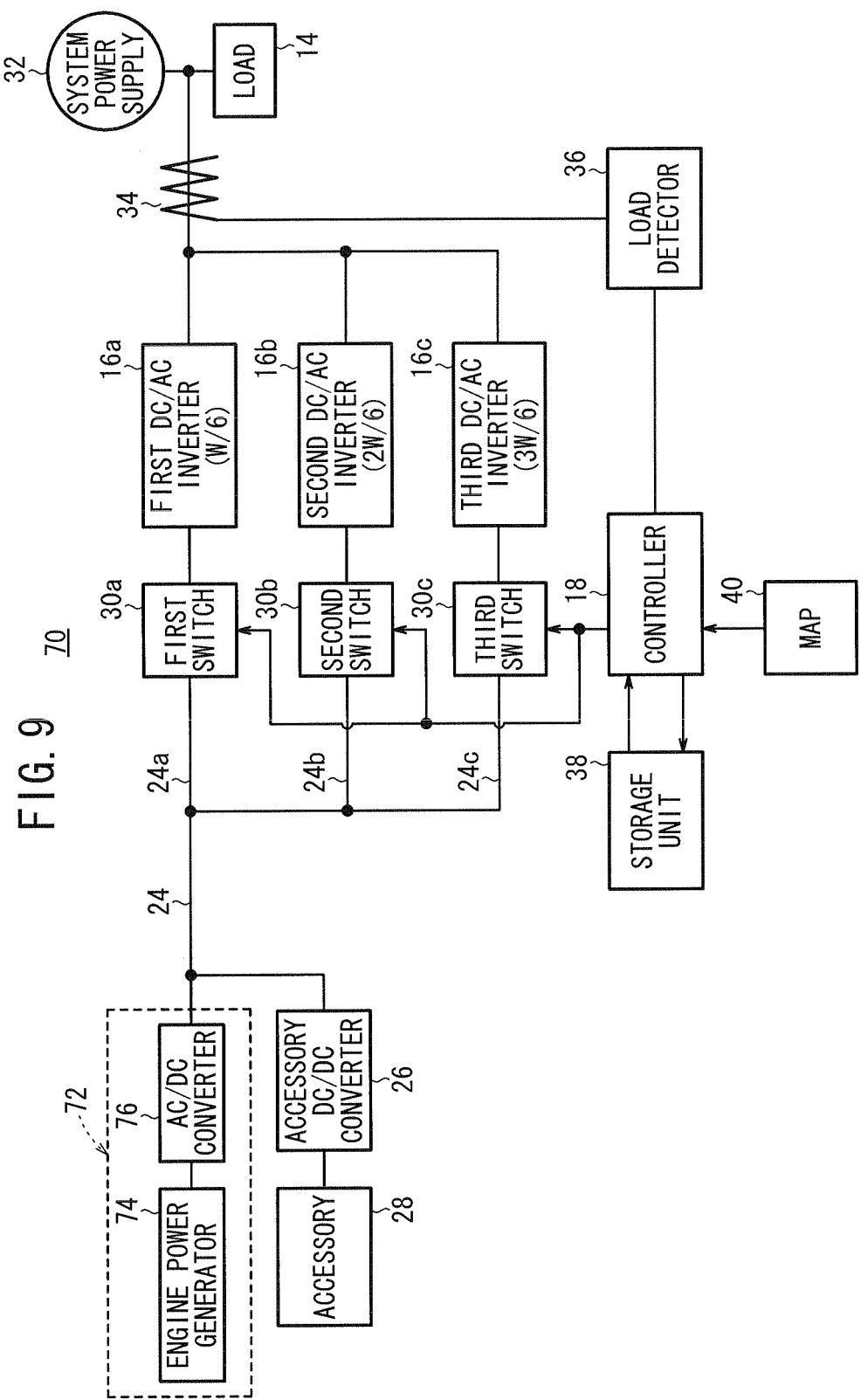
FIG. 9 is a block diagram of an alternating current power supply device according to a fourth embodiment of the present invention.
Figure 10:
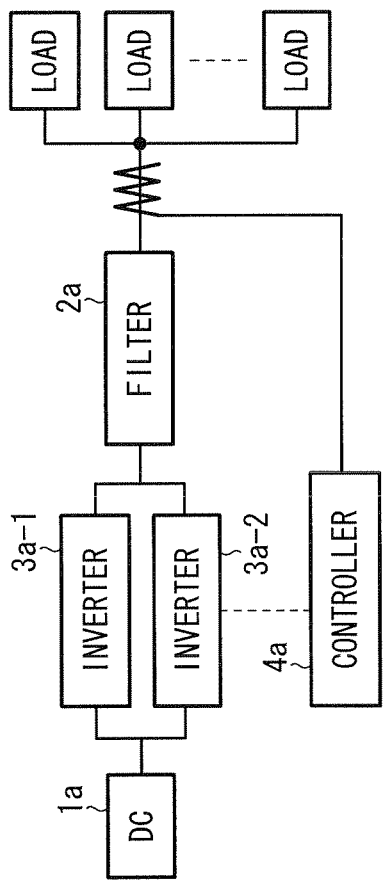
FIG. 10 is a block diagram of a low-loss power supply device disclosed in Japanese Laid-Open Patent Publication No. 61-135364.
Figure 11:
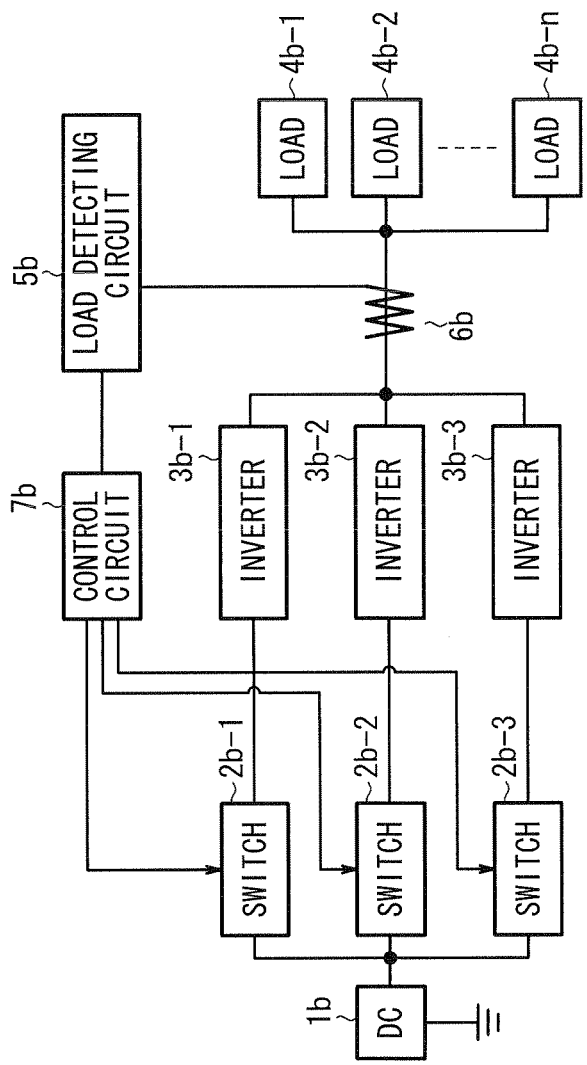
FIG. 11 is a block diagram of a low-loss power supply device disclosed in Japanese Laid-Open Patent Publication No. 61-135365.
Figure 12:
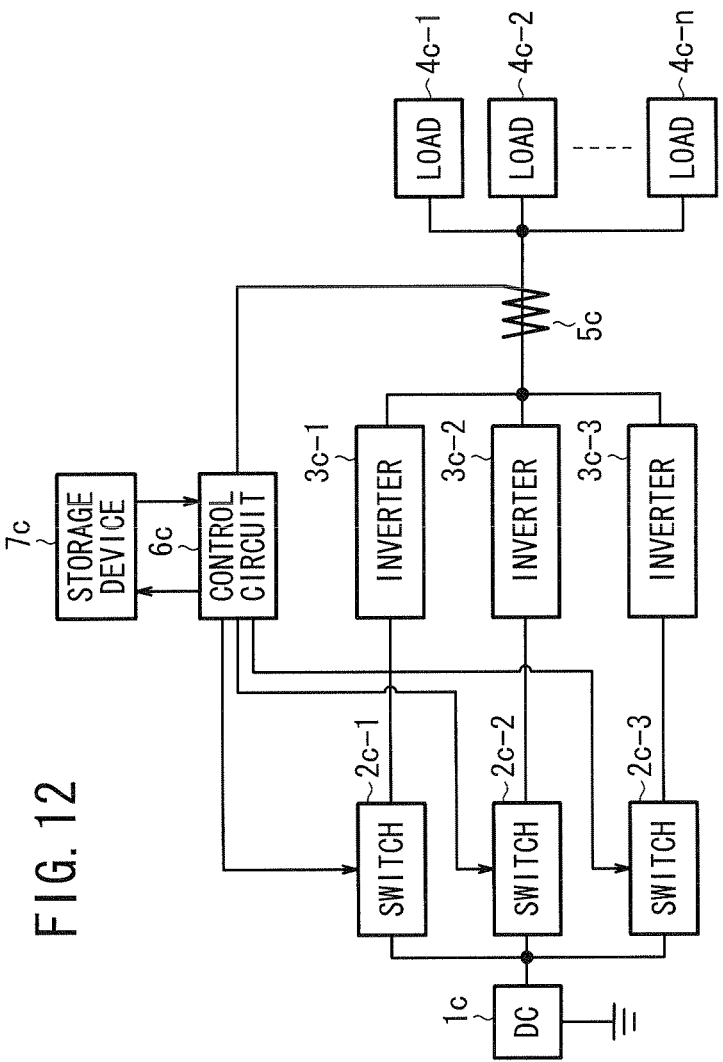
FIG. 12 is a block diagram of a power converting device disclosed in Japanese Laid-Open Patent Publication No. 61-135366.

FIG. 9 is a block diagram of an alternating current power supply device 70 according to a fourth embodiment of the present invention.

The alternating current power supply device 70 includes a direct current power supply 72 which comprises an engine power generator 74 as an alternating current power generator and an AC/DC converter 76 for converting an alternating current voltage output from the engine power generator 74 into a given direct current voltage.

In the third and fourth embodiments, each of the direct current power supplies 62, 72 includes the alternating current power generator (the wind power generator 64 or the engine power generator 74) and the alternating current to direct current converter (the AC/DC converter 66 or the AC/DC converter 76) that is electrically connected to the alternating current power generator.

Therefore, any of various alternating current power generators can be incorporated in the direct current power supplies 62, 72 for better versatility. Since the alternating current power generator may be the wind power generator 64 or the engine power generator 74, each of the alternating current power supply devices 60, 70 is simple and economical in construction, and is easily increased in versatility.

The invention claimed is:
1. An alternating current power supply device comprising:
a direct current power supply for generating direct current power;
a plurality of parallel direct current to alternating current converters electrically connected to the direct current power supply, for converting the direct current power generated by the direct current power supply into alternating current power and supplying the alternating current power to a load;

a controller for controlling operation of the direct current to alternating current converters; and a storage unit for storing performance information and operation histories of the direct current to alternating current converters, wherein of n (n: a natural number of 2 or greater) direct current to alternating current converters, capacity A(m) of the mth (m: a natural number, 1≤m≤n) direct current to alternating current converter is related to rated output W of the direct current power supply by A(m)=2mW/(n(n+1)); and wherein, when there are a plurality of combinations of the direct current to alternating current converters, the controller selects a combination of direct current to alternating current converters with a shortest accumulated operating time based on the operation histories of each of the direct current to alternating current converters stored in the storage unit, the shortest accumulated operating time being a sum of a past time of operation for each of the direct current to alternative current converters in the combination, and the controller preferentially controls the selected combination of direct current to alternating current converters.

2. The alternating current power supply device according to claim 1, further comprising a demanded load power detector for detecting a demanded load power which is a demanded power required by the load, wherein the controller controls operation of each of the direct current to alternating current converters depending on the detected demanded load power.

3. The alternating current power supply device according to claim 1, wherein the controller preferentially operates one of the direct current to alternating current converters which can handle a demanded load power and which has a smaller capacity.

4. The alternating current power supply device according to claim 1, wherein the controller preferentially operates one of the direct current to alternating current converters which has a higher conversion efficiency for a demanded load power.

5. The alternating current power supply device according to claim 1, wherein the direct current power supply includes a fuel cell for generating electric power based on an electrochemical reaction between a fuel gas and an oxygen-containing gas.

6. The alternating current power supply device according to claim 5, wherein the fuel cell comprises a solid oxide fuel cell.

7. The alternating current power supply device according to claim 1, wherein the direct current power supply includes a solar cell.

8. The alternating current power supply device according to claim 1, wherein the direct current power supply comprises an alternating current power generator and an alternating current to direct current converter electrically connected to the alternating current power generator.

9. The alternating current power supply device according to claim 8, wherein the alternating current power generator comprises at least either one of a wind power generator and an engine power generator.

10. A method of controlling an alternating current power supply device including:

a direct current power supply for generating direct current power;

a plurality of parallel direct current to alternating current converters electrically connected to the direct current power supply, for converting the direct current power generated by the direct current power supply into alternating current power and supplying the alternating current power to a load;

a controller for controlling operation of the direct current to alternating current converters; and a storage unit for storing performance information and operation histories of the direct current to alternating current converters, wherein of n (n: a natural number of 2 or greater) direct current to alternating current converters, capacity A(m) of the mth (m: a natural number, 1≤m≤n) direct current to alternating current converter is related to rated output W of the direct current power supply by A(m)=2mW/(n(n+1)); and wherein, when there are a plurality of combinations of the direct current to alternating current converters, the controller selects a combination of direct current to alternating current converters with a shortest accumulated operating time based on the operation histories of each of the direct current to alternating current converters stored in the storage unit, the shortest accumulated operating time being a sum of a past time of operation for each of the direct current to alternative current converters in the combination, and the controller preferentially controls the selected combination of direct current to alternating current converters;

the method comprising:
a first step of detecting a demanded load power which is a demanded power required by the load;
a second step of setting a combination of the direct current to alternating current converters for operation depending on the detected demanded load power;
a third step of determining whether there are a plurality of combinations or not; and
a fourth step of, if it is judged that there are a plurality of combinations, selecting one of the combinations.

11. The method according to claim 10, wherein the fourth step preferentially selects one of the combinations which can handle a demanded load power and which has a smaller capacity.

12. The method according to claim 10, wherein the fourth step preferentially selects one of the combinations which has a higher conversion efficiency for a demanded load power.

13. The method according to claim 10, wherein the direct current power supply includes a fuel cell for generating electric power based on an electrochemical reaction between a fuel gas and an oxygen-containing gas.

14. The method according to claim 13, wherein the fuel cell comprises a solid oxide fuel cell.

15. The method according to claim 10, wherein the direct current power supply includes a solar cell.

16. The method according to claim 10, wherein the direct current power supply comprises an alternating current power generator and an alternating current to direct current converter electrically connected to the alternating current power generator.

17. The method according to claim 16, wherein the alternating current power generator comprises at least either one of a wind power generator and an engine power generator.

* * * * *